US012664029B2

(12) United States Patent
Sethi

(10) Patent No.: US 12,664,029 B2
(45) Date of Patent: Jun. 23, 2026

(54) SYSTEM AND METHOD FOR MANAGING RESOURCE ELASTICITY FOR A PRODUCTION ENVIRONMENT WITH LOGICAL DEVICES

(71) Applicant: Dell Products L.P., Round Rock, TX (US)

(72) Inventor: Parminder Singh Sethi, Punjab (IN)

(73) Assignee: Dell Products L.P., Round Rock, TX (US)

( * ) Notice: Subject to any disclaimer, the term of this patent is extended or adjusted under 35 U.S.C. 154(b) by 586 days.

(21) Appl. No.: 18/156,310

(22) Filed: Jan. 18, 2023

(65) Prior Publication Data

US 2024/0241767 A1     Jul. 18, 2024

(51) Int. Cl.
| | |
|---|---|
| *G06F 9/46* | (2006.01) |
| *G06F 9/455* | (2018.01) |
| *G06F 9/50* | (2006.01) |
| *H04L 43/16* | (2022.01) |

(52) U.S. Cl.
CPC ........ G06F 9/5077 (2013.01); G06F 9/45533 (2013.01); H04L 43/16 (2013.01)

(58) Field of Classification Search
CPC .................................................. G06F 9/5077
USPC ........................................................ 718/100
See application file for complete search history.

(56) References Cited

U.S. PATENT DOCUMENTS

| | | | | |
|---|---|---|---|---|
| 8,935,692 | B2 * | 1/2015 | Ferris .................... | G06F 9/5077 |
| | | | | 718/1 |
| 11,734,073 | B2 * | 8/2023 | Gonzalez .............. | G06F 9/5027 |
| | | | | 718/104 |
| 2009/0293056 | A1 * | 11/2009 | Ferris .................. | G06F 9/45554 |
| | | | | 718/1 |
| 2014/0282519 | A1 * | 9/2014 | Apte ................... | G06F 9/45533 |
| | | | | 718/1 |
| 2014/0365795 | A1 * | 12/2014 | Nielsen ................... | G06F 1/329 |
| | | | | 713/320 |
| 2014/0379930 | A1 * | 12/2014 | Ferris .................... | G06F 9/5077 |
| | | | | 709/226 |
| 2015/0347264 | A1 * | 12/2015 | Mohammed ........ | G06F 9/45558 |
| | | | | 714/45 |
| 2016/0077859 | A1 * | 3/2016 | Cropper ................ | G06F 9/4418 |
| | | | | 718/1 |
| 2017/0041184 | A1 * | 2/2017 | Broz .................... | H04L 43/0817 |
| 2017/0201574 | A1 * | 7/2017 | Luo ......................... | H04L 47/70 |
| 2020/0012510 | A1 * | 1/2020 | Andrianov .......... | G06F 9/45558 |
| 2020/0301724 | A1 * | 9/2020 | Sakthivel ................ | G06F 9/505 |
| 2021/0103505 | A1 * | 4/2021 | Tsuchiya .............. | G06F 11/076 |
| 2021/0303329 | A1 * | 9/2021 | Tsuchiya ............. | G06F 9/45558 |
| 2022/0308928 | A1 * | 9/2022 | Lan ......................... | H04L 49/70 |

(Continued)

*Primary Examiner* — Mehran Kamran
(74) *Attorney, Agent, or Firm* — Chamberlain, Hrdlicka, White, Williams & Aughtry; Aly Z. Dossa

(57)     ABSTRACT
A method for managing a production environment includes obtaining a notification for an alert event for the production environment, in response to the notification: making a determination that a resource limitation is exceeded by the alert event, based on the determination, performing a resource elasticity process based on a priority list to increase the resource limitation to a new resource limitation such that the alert event does not exceed the new resource limitation, wherein the resource limitation is based on available computing resources in the production environment, and resolving the alert event after the increase of the resource limitation.

14 Claims, 5 Drawing Sheets

(56)     References Cited

U.S. PATENT DOCUMENTS

| | | | |
|---|---|---|---|
| 2023/0229476 A1* | 7/2023 | Oki | G06F 9/45558 |
| | | | 718/1 |
| 2023/0273836 A1* | 8/2023 | Cosentino | G06F 9/5022 |
| | | | 718/1 |
| 2024/0241767 A1* | 7/2024 | Sethi | H04L 43/16 |

* cited by examiner

400

SYSTEM AND METHOD FOR MANAGING RESOURCE ELASTICITY FOR A PRODUCTION ENVIRONMENT WITH LOGICAL DEVICES

BACKGROUND

Computing devices in a system may include any number of hardware resources such as processors, memory, and persistent storage. The computing devices may utilize the hardware resources to host any number of logical devices or virtual machines. The use of the hardware resources may impose a scarcity of resources on the computing devices. The introduction of additional logical devices or virtual machines to the computing devices may exacerbate such scarcity.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
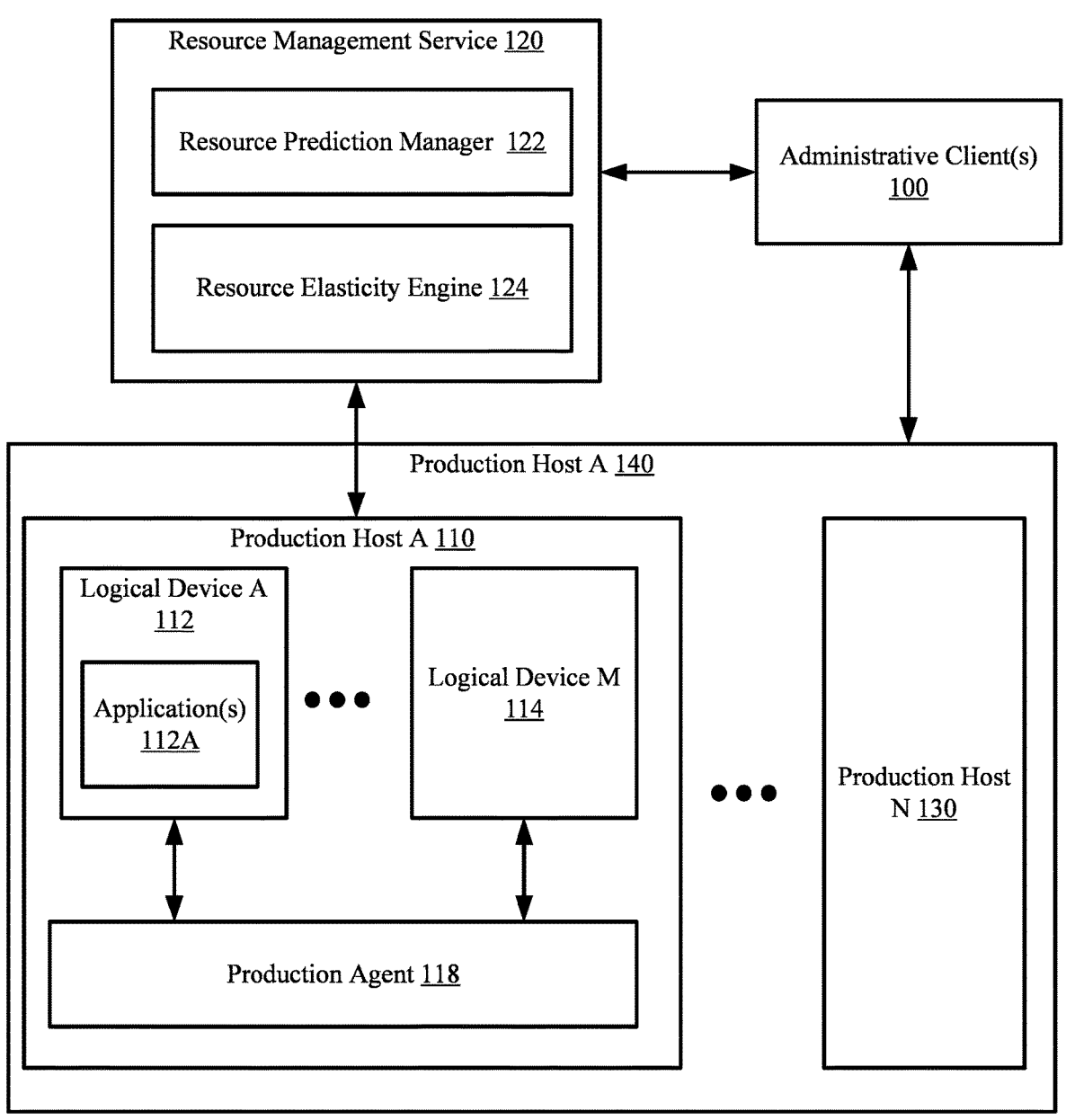
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing logical devices. Specifically, embodiments relate to methods and systems for managing a production environment that hosts logical devices such as, for example, virtual machines and logical devices. The production host environment may include any number of production hosts that each execute a combination of logical devices and/or virtual machines. The logical devices and virtual machines may impose an operational burden on the hardware resources of the production hosts.

The logical devices and virtual machines may be added, removed, or otherwise modified in the production environment in response to administrative action. For example, an administrative system may initiate the execution of new logical devices or new virtual machines in the production environment. The introduction of new logical devices or virtual machines may require a minimum amount of hardware resources of the production hosts. If a production host does not have the required hardware resources to install a logical device, the logical device may not be installed. This may create an issue in cases where a high amount of workloads are introduced that require the installation of additional logical devices.

To overcome the issue of requiring additional logical devices in cases where the hardware resources are not available, embodiments disclosed herein provide a method for performing temporary suspension of low priority logical devices to reduce the resource use by such low priority logical devices. This may increase the number of available resources for the introduction of new logical devices. Embodiments disclosed herein include performing four stages for resolving this issue: a monitoring stage, a priority determination stage, an alert event stage, and a resource elasticity stage.

In one or more embodiments, the monitoring stage includes monitoring the resource use of the logical devices to obtain performance metrics and resource utilization metrics of the logical devices. The metrics may specify each logical device, a status of the logical devices (e.g., an active status, a standby status, a suspended status, etc.), an age of the logical devices, a software version of the logical device, and/or any other information without departing from the invention.

In one or more embodiments, the results of the monitoring stage are used for the priority determination stage. The priority determination stage includes classifying each logical device in a production host (or in the production environment) to assign a priority tag to each logical device. The priority tag may specify, for example, a high priority of a logical device, a medium priority of the logical device, or a low priority of the logical device. The priority tags may be assigned based on the performance metrics, resource utilization metrics, and/or any other information obtained during the monitoring stage. Further, the priority tags may be assigned based on assignments by the administrative system.

In one or more embodiments of the invention, the alert event stage includes monitoring activity of the production environment and logging any events that may trigger action in the resource elasticity stage. Examples of events logged in the alert event stage may include, for example, a request for installation of a new logical device, an error event that indicates a logical device improperly executed because of lack of resources, a change in status of a logical device, a deletion of a logical device, and a notification of low resources. Other events may be logged in the alert event stage without departing from the invention.

In one or more embodiments, a request for installation of a new logical device while the production host has low resources may trigger an alert event. The alert event may trigger the resource elasticity stage. In the resourced elasticity stage, a resource need calculation is performed that calculates the amount of resources required for each new logical device. Further, an intelligence engine may determine which of the currently ready logical devices are to be suspended. Such determination may be based on, for example, the priority tags generated in the priority determination stage. The suspension of the logical devices may provide additional available resources that may be used for the installation of the new logical devices.

Various embodiments of the invention are disclosed herein.

FIG. 1 shows an example system in accordance with one or more embodiments of the invention. The system includes a production environment (140), which includes any number of production hosts (110, 130), a secondary production environment (150), a resource management service (120), and any number of administrative clients (100). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the production environment (140) includes production hosts (110, 130). Each production host (110, 130) may host one or more logical devices (112, 114). The logical devices (112, 114) may be entities that are virtualized to the hardware components in the production host (112, 114). Examples of logical devices (112, 114) include, but are not limited to, virtual machines and application containers. An application container may be a logical device that is virtualized, e.g., on an operating system (OS) level of the production hosts (110, 130) using computing resources (not shown) of the production hosts). In contrast, the virtual machines may operate each using their own operating system, each managed using a hypervisor (not shown) that serves as an intermediate layer between the operating system of the virtual machines and the hardware resources. Each of the logical devices (112, 114) may executed independently from other logical devices (112, 114) in the production host (110, 130). The logical devices (112, 114) may each host applications (112A). Each of the applications (112A) may be performing similar or different processes. In one or more embodiments of the invention, the applications (112A) provide services to users, e.g., clients (not shown). For example, the applications (112A) may host components. The components may be, for example, instances of databases, email servers, operating systems, and/or other components. The applications (112A) may host other types of components without departing from the invention. An application (112A) may be executed on one or more logical devices (112, 114) as instances of the application.

In one or more embodiments, the logical devices (112, 114) in the production environment (140) are grouped into workload clusters. The workload clusters may be a system of processes performed to service a goal of an entity (e.g., a corporate entity). The goal may be, for example, a business related workload. The business related workload may include servicing customers of the corporate entity. The workload cluster may be expected, at least by the entity, to operate within service level objectives (SLOs). In one or more embodiments, the workload cluster relies on dependencies between applications across logical devices. For example, a first application may service the workload of a workload cluster using data generated by a second application.

tion. The second application may operate in a second logical device different from the first application.

In one or more embodiments, as more active logical devices are installed in a production host (e.g., as requested by the administrative clients (100)), fewer computing resources are available for use. This may cause a resource limitation to be reached, thus preventing new logical devices from being installed. A solution to reducing the computing resources and preventing the resource limitation from exceeding would be to suspend the activity of one or more active logical devices (112, 114). In one or more embodiments, the suspension of a logical device (112, 114) refers to the prevention of the logical device (112, 114) from utilizing computing resources to service workloads. The suspension of the logical device (112, 114) may place it in a suspended (or inactive) state. A suspended logical device (112, 114) may be unsuspended to return it to an active state.

In one or more embodiments of the invention, the logical devices (112, 114) are implemented as computer instructions, e.g., computer code, stored on a persistent storage that when executed by a processor(s) of a computing device cause the computing device to provide the functionality of the logical devices (112, 114) described throughout this application.

In one or more embodiments of the invention, the production agent (118) includes functionality for obtaining information associated with the logical devices (112, 114). The production agent (118) may include functionality for obtaining information from the application containers that are associated with the operability (e.g., resource consumption) of the application containers. The monitoring may be performed in accordance with FIGS. 2A-2B.

In one or more embodiments of the invention, the production agent (118) is implemented as computer instructions, e.g., computer code, stored on a persistent storage that when executed by a processor(s) of a computing device cause the computing device to provide the functionality of the production agent (118) described throughout this application.

In one or more embodiments of the invention, the resource management service (120) includes functionality for obtaining information from the production agent (118) to determine a resource elasticity process for suspending the activity of the logical devices (112, 114) from the production environment (140). The resource management service (120) may determine the resource elasticity process in accordance with FIGS. 2A-2B. To perform the aforementioned functionality, the resource management service (120) includes a resource prediction manager (122) and a resource elasticity engine (124). The resource management service (120) may include additional, fewer, and/or different components without departing from the invention.

In one or more embodiments, the resource prediction manager (122) includes functionality for predicting an expected resource use of an incoming logical device (e.g., a logical device that is to be installed at a later point in time). The prediction may be performed based on the historical activity of current logical devices (112, 114) as monitored by the production agent (118) (or any other entity). Further, the prediction may be performed in accordance with, e.g., FIG. 2B.

In one or more embodiments, the resource elasticity engine (124) includes functionality for changing the status of the logical devices (112, 114) in accordance with a resource elasticity process. The resource elasticity engine (124) may send suspension requests to each logical device determined to be suspended. In this manner, the resources that would have been used by the logical devices are available for additional logical devices to be installed. The resource elasticity engine (124) may perform its functionality in accordance with the method of FIG. 2B.

Figure 4:
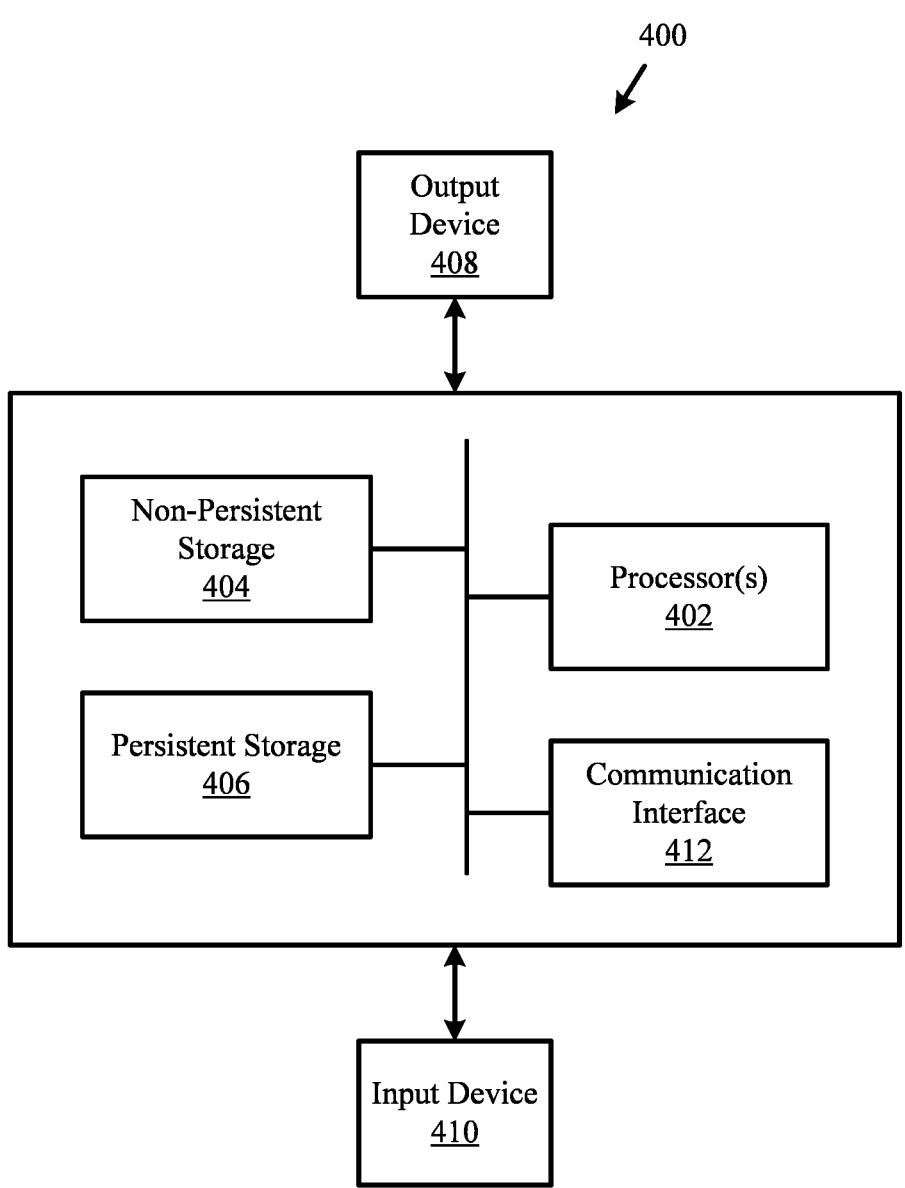
FIG. 4 shows a diagram of a computing device in accordance with one or more embodiments of the invention.

In one or more embodiments of the invention, the resource management service (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the resource management service (120) described throughout this application and/or all, or a portion thereof, of the methods illustrated in FIGS. 2A-2B.

In one or more embodiments of the invention, the resource management service (120) is implemented as a logical device. The logical device may utilize the computing resources of any number of computing devices and thereby provide the functionality of the resource management service (120) described throughout this application and/or all, or a portion thereof, of the methods illustrated in FIGS. 2A-2B.

In one or more embodiments of the invention, the production hosts (110, 130) are implemented as computing devices (see e.g., FIG. 4). The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production hosts (110, 130) described throughout this application and/or all, or a portion thereof, of the methods illustrated in FIG. 2.

In one or more embodiments of the invention, the production hosts (110, 130) are each implemented as a logical device. The logical device may utilize the computing resources of any number of computing devices and thereby provide the functionality of the production hosts (110, 130) described throughout this application and/or all, or a portion thereof, of the methods illustrated in FIG. 2.

While the system of FIG. 1 illustrates a production environment (140), the system may include additional production environments without departing from the invention.

Figure 2A:
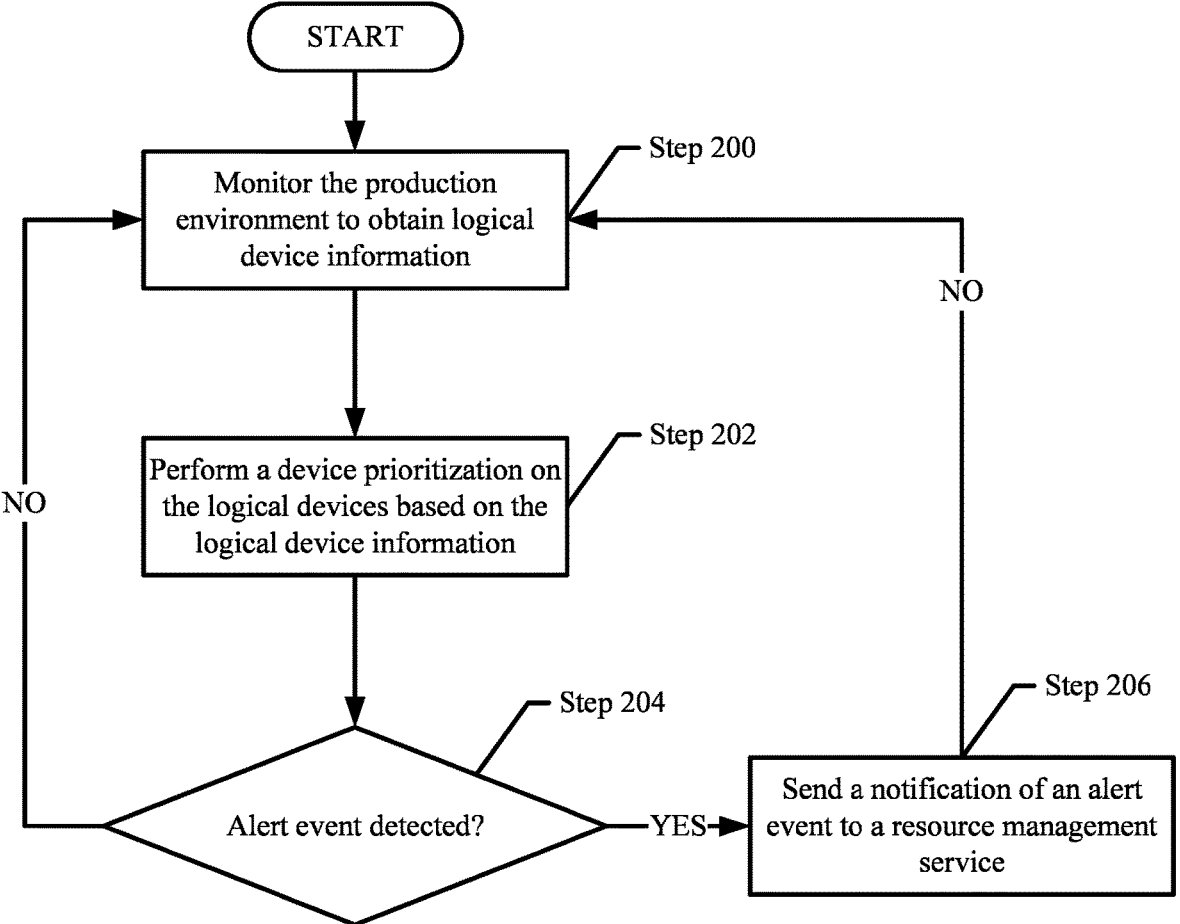
FIG. 2A shows a flowchart for monitoring a production environment for alert events in accordance with one or more embodiments of the invention.
Figure 2B:
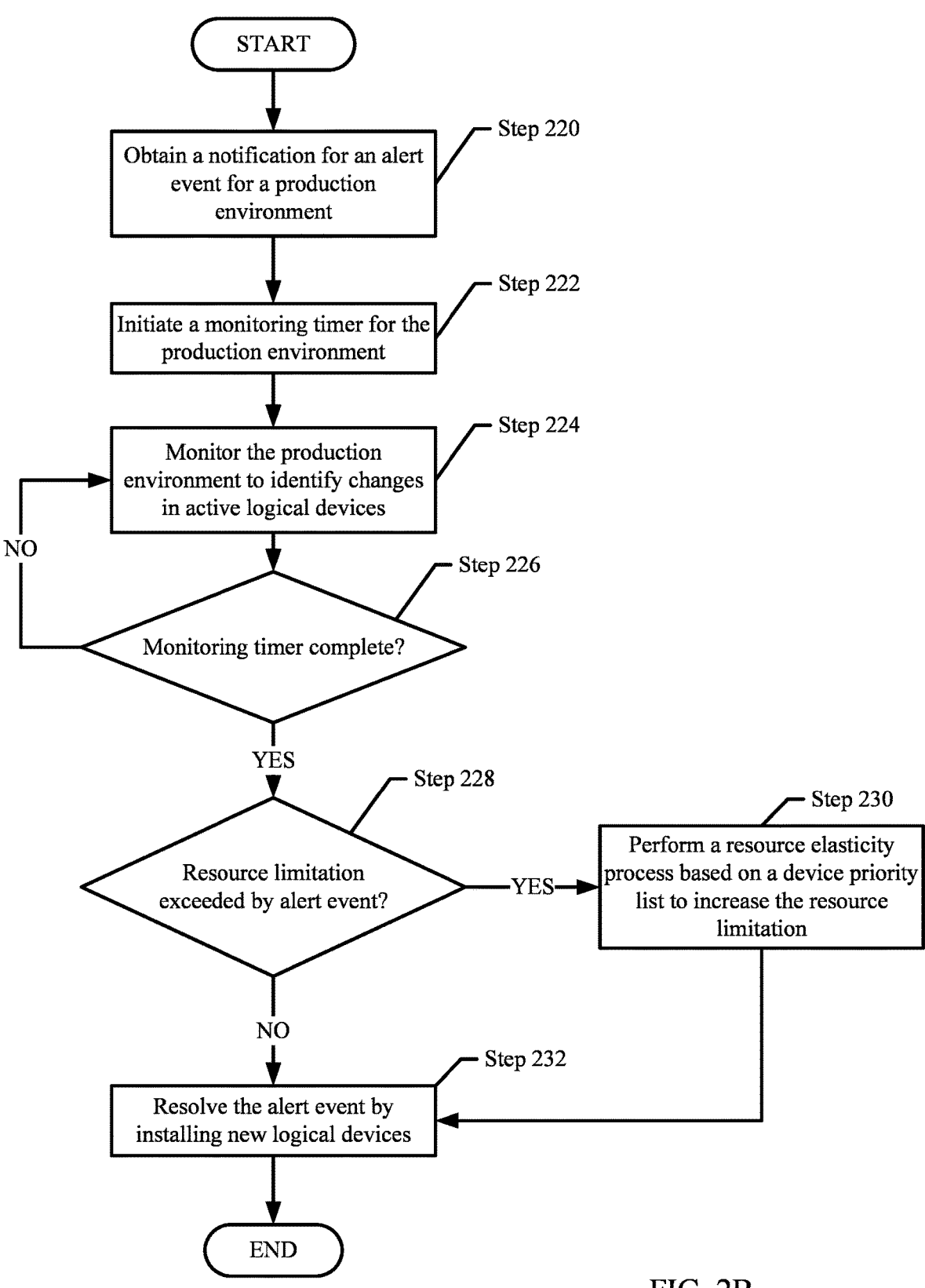
FIG. 2B shows a flowchart for managing resource use of a production environment following an alert event in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for monitoring a production environment for alert events in accordance with one or more embodiments of the invention. The method shown in FIG. 2A may be performed by, for example, a resource management service (120, FIG. 1). Other components of the system illustrated in FIG. 1 may perform the method of FIG. 2A without departing from the invention.

Turning to FIG. 2A, in step 200, the production environment is monitored to obtain logical device information. In one or more embodiments, the logical device information may include the states of each of the logical devices (e.g., active states, suspended states, standby states, failed states, etc.), an activity of each of the logical devices, an age of each logical device, and a resource consumption of the logical devices over a predetermined period of time. Other information may be included without departing from the invention.

In one or more embodiments, the monitoring further includes detecting for any alert events. For example, the resource management service may keep a log of any events that occur in the production environments. Examples of events logged in the alert event stage may include, for example, a request for installation of a new logical device, an error event that indicates a logical device improperly executed because of lack of resources, a change in status of a logical device, a deletion of a logical device, and a notification of low resources. Other events may be logged in the alert event stage without departing from the invention.

In step 202, a device prioritization is performed on the logical devices based on the logical device information. In one or more embodiments, the device prioritization includes classifying each logical device in a production host (or in the production environment) to assign a priority tag to each logical device. The priority tag may specify, for example, a high priority of a logical device, a medium priority of the logical device, or a low priority of the logical device. The priority tags may be assigned based on the performance metrics, resource utilization metrics, and/or any other information obtained during the monitoring stage. Further, the priority tags may be assigned based on assignments by the administrative system.

In step 204, a determination is made about whether an alert event is detected. In one or more embodiments, an alert event may relate to a request for installation of one or more logical devices while a production host (or the production environment) while the resource limitation is at a critical condition. In one or more embodiments, the resource limitation is a value of the amount of available resources (e.g., processing, persistent storage, non-persistent storage, etc.) for use by new logical devices. The resource limitation being in a critical condition may relate to the value being below a threshold value. The threshold value may be one that is set by the administrative clients. If an alert event is detected, the method proceeds to step 206; otherwise, the method proceeds to step 200.

In step 206, following the determination that an alert event is detected, a notification of an alert event is sent to a resource management service. In one or more embodiments of the invention, if the entity performing the method of FIG. 2A is the resource management service, step 206 may be simply the initiation of the method of FIG. 2B. In one or more embodiments, the notification specifies the alert event (e.g., the request for the installation of one or more logical devices) and the detection of the resource limitation in a critical condition. The notification may include other information without departing from the invention.

FIG. 2B shows a flowchart for managing resource use of a production environment following an alert event in accordance with one or more embodiments of the invention. The method shown in FIG. 2B may be performed by, for example, a resource management service (120, FIG. 1).

Other components of the system illustrated in FIG. 1 may perform the method of FIG. 2B without departing from the invention.

In step 220, a notification for an alert event is obtained for a production environment. In one or more embodiments of the invention, the notification obtained in step 220 is the notification generated in step 206 of FIG. 2A. As discussed in FIG. 2A, the notification specifies the request for installation of one or more logical devices and the resource limitation being in a critical condition.

In step 222, a monitoring timer for the production environment is initiated for the production environment. In one or more embodiments, the monitoring timer is a time period, defined by the administrative clients, for waiting to see if the resource limitation increases. In this manner, by waiting a time period to see if additional resources become available, the production environment may be equipped to service the installation of additional logical devices.

In step 224, the production environment is monitored to identify changes in active logical devices. In one or more embodiments, the changes monitored in step 224 may include the installation of additional logical devices, the deletion of logical devices, the suspension of logical devices, the un-suspension of logical devices, and any/other changes that may impact the resource availability of the production environment.

In step 226, following the monitoring of the 224, a determination is made about whether monitoring timer is complete. If the threshold time is met, the method proceeds to step 228; otherwise, the method returns to step 224.

In step 228, following the determination that the threshold time is met, a second determination is made about whether the resource limitation is exceeded by the alert event. In one or more embodiments, the determination of step 228 is based on a calculation of a resource requirement of the logical devices to be installed by resolving the alert event. The resource requirement may be calculated by identifying the number of logical devices to be installed from the request, the type of logical devices (e.g., virtual machine, application container, etc.), the number of applications to be installed for each logical device, and/or any other information associated with the logical devices. The resource requirement may be compared to the resource limitation to make the determination of whether the resource limitation is exceeded by the resource requirement. If the resource limitation is exceeded by the resource requirement, the method proceeds to step 230; otherwise, the method proceeds to step 232.

In step 230, following the determination that the resource limitation is exceeded by resolving the alert event, a resource elasticity process is performed based on a device priority list to increase the resource limitation. In one or more embodiments of the invention, the resource elasticity process first includes determining an order of suspension of the currently active logical devices in the production environment. The suspension order may be determined based on the priority list. For example, the logical devices with the lowest priority tags may be assigned higher in the suspension order. The resource elasticity process further includes selecting the logical devices to be suspended based on the suspension order, the resource utilization of the logical devices, and the resource requirement discussed above. For example, the logical devices may be selected in the order of the suspension order, and the number of logical devices to be suspended may be determined such that the total resource utilization of the selected logical devices at least exceeds the resource requirement of the logical devices to be installed. The number of logical devices to be removed may be calculated based on the amount of resources that would be made available from suspending the logical devices. This would result in an increase in the resource limitation. The logical devices may be selected for suspension until the result of the suspension is a resource limitation that is increased to be a higher value than that of the resource requirement. After the logical devices to be suspended are selected, the resource management service may initiate the suspension of the selected logical devices.

In step 232, the alert event is resolved by installing new logical devices. In one or more embodiments, after the selected logical devices are suspended and the resource limitation is increased to provide additional resources for the installation of new logical devices, the logical devices specified in the request are installed and provided the required resources.

EXAMPLE

Figure 3:
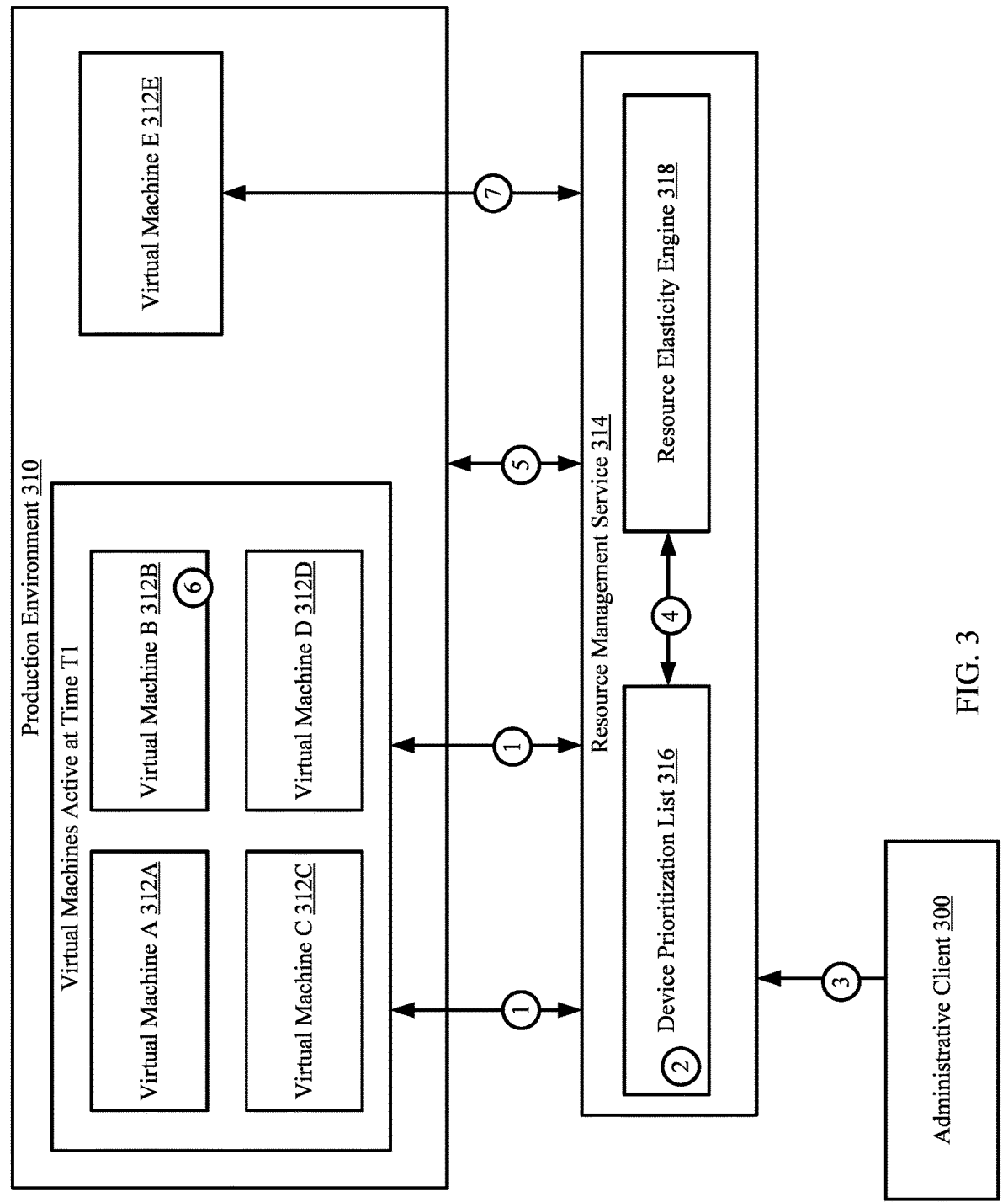
FIG. 3 shows an example in accordance with one or more embodiments of the invention.

The following section describes an example. The example, illustrated in FIG. 3, is not intended to limit the invention and is independent from any other examples discussed in this application. Turning to the example, consider a scenario in which a virtual machine is to be installed in a production environment with low resource availability.

Turning to the example, FIG. 3 shows a diagram of an example system. For the sake of brevity, not all components of the example system may be illustrated in FIG. 3. The example system includes a production environment (310), a resource management service (314), and an administrative client (300).

At a first point in time T1, the resource management service (314) collects logical device information regarding the currently executing virtual machines (312A, 312B, 312C, 312D) in accordance with FIG. 2A. Based on the monitoring, a device prioritization list (316) is generated that specifies the priorities of the VMs (312A, 312B, 312C, 312D). Further, the resource management service generates a value of the total resource usage of the virtual machines (312A, 312B, 312C, 312D) used during the monitoring. Table 1 shows the priority of the virtual machines and the values of the resources. In this example, the resource usage is rated on a scale of one to ten.

TABLE 1

| Virtual Machine (VM) | Priority | Processing Usage (rating out of 10) | Networking Usage (rating out of 10) | Total Hardware Reserved (rating out of 10) |
|---|---|---|---|---|
| VM A | Very Low | 3 | 5 | 2 |
| VM B | Very Low | 4 | 4 | 2 |
| VM C | Low | 8 | 6 | 5 |
| VM D | High | 10 | 7 | 6 |

As shown in Table 1, VM A (312A) and VM B (312B) are both in a low priority. At a later point in time T2, an administrative client (300) sends a request to install a new VM [3]. The request triggers an alert event based on the detection of a resource limitation being below a predefined threshold. In response to the alert event, the resource elasticity engine (318) of the resource management service (318) calculates an estimated resource requirement of the VM to determine that the resources may be similar to the resources of VM C (312C). Based on this determination, the resource elasticity engine (318) refers to the device prioritization list (316) to identify a suspension order of suspending the VMs (312A, 312B, 312C, 312D) [4]. The suspension order is as follows: VM A (312A) is first, VM B (312B) is second, VM C (312C) is third, and VM D (312D) is fourth. Further, based on the calculated resource requirement, the resource elasticity engine (318) determines that the fewest number of VMs that can be suspended for the resource limitation to be sufficiently increased is two. Based on this determination, the resource elasticity engine (318) selects VMs A (312A) and B (312B) to suspend. The resource management service (314) therefore sends suspension requests for both VM A (312A) and B (312B) [5]. As a result, VMs A (312A) and B (31B) are set to a suspended state and therefore do not use resources [6]. This results in an increase in the resource limitation such that the resource requirement of a new VM does not exceed the resource limitation. Following this, the resource management engine (318) installs the new VM, labeled VM E (312E) [7].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406).

Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the operation of a production environment by managing the resource use. Embodiments disclosed herein provide an efficient use of resources when the available resources are low by monitoring the resource use to determine a priority of the logical devices. In this manner, the lower priority logical devices do not unnecessarily use up resources if additional logical devices are to be installed. This reduces any latency caused by the attempt to install logical devices when the resources in the production environment are scarce.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a production environment, comprising:

obtaining a notification for an alert event for the production environment, wherein the alert event is for installation of a new logical device in the production environment while the resources in the production environment are in a critical condition;

in response to the notification:

making a determination that a resource limitation is exceeded by the alert event, wherein the determination is based on a total resource availability of the production environment and further based on an expected resource use of the new logical device;

based on the determination, performing a resource elasticity process based on a priority list to increase the resource limitation to a new resource limitation such that the alert event does not exceed the new resource limitation, wherein the resource limitation is based on available computing resources in the production environment, wherein the resource elasticity process comprises:

determining an order of suspension of currently active logical devices in the production environment based on the priority list, wherein the order of suspension is determined based on a monitoring of the currently active logical devices based on performance metrics and resource utilization metrics of each of the currently active logical devices; and suspending, based on the order of suspension, the currently active logical devices to increase to the new resource limitation; and resolving the alert event after the increase of the resource limitation.

2. The method of claim 1, further comprising:

prior to performing the resource elasticity process, initiating a monitoring timer;

monitoring, within the monitoring timer, the production environment for a second increase in the resource limitation; and making a second determination, after completion of the monitoring timer, that the resource limitation did not increase.

3. The method of claim 1, further comprising:

obtaining a second notification for a second alert event;

in response to the second notification:

making a second determination that the resource limitation is exceeded by the alert event;

initiating a monitoring timer;

monitoring, within the monitoring timer, the production environment for a second increase in the resource limitation;

making a third determination, after completion of the monitoring timer, that the resource limitation increased to a second new resource limitation;

making a third determination that the second new resource limitation is not exceeded by the second alert event; and resolving the alert event after the increase of the resource limitation.

4. The method of claim 1, wherein at least one logical device of the currently active logical devices is a virtual machine.

5. The method of claim 1, wherein at least one logical device of the currently active logical devices is an application container.

6. A non-transitory computer readable medium comprising computer readable program code, which when executed by a computer processor enables the computer processor to perform a method for managing a production environment, the method comprising:

obtaining a notification for an alert event for the production environment, wherein the alert event is for installation of a new logical device in the production environment while the resources in the production environment are in a critical condition;

in response to the notification:

making a determination that a resource limitation is exceeded by the alert event, wherein the determination is based on a total resource availability of the production environment and further based on an expected resource use of the new logical device;

based on the determination, performing a resource elasticity process based on a priority list to increase the resource limitation to a new resource limitation such that the alert event does not exceed the new resource limitation, wherein the resource limitation is based on available computing resources in the production environment, wherein the resource elasticity process comprises:

determining an order of suspension of currently active logical devices in the production environment based on the priority list, wherein the order of suspension is determined based on a monitoring of the currently active logical devices based on performance metrics and resource utilization metrics of each of the currently active logical devices; and suspending, based on the order of suspension, the currently active logical devices to increase to the new resource limitation; and resolving the alert event after the increase of the resource limitation.

7. The non-transitory computer readable medium of claim 6, the method further comprising:

prior to performing the resource elasticity process, initiating a monitoring timer;

monitoring, within the monitoring timer, the production environment for a second increase in the resource limitation; and making a second determination, after completion of the monitoring timer, that the resource limitation did not increase.

8. The non-transitory computer readable medium of claim 6, the method further comprising:

obtaining a second notification for a second alert event;

in response to the second notification:

making a second determination that the resource limitation is exceeded by the alert event;

initiating a monitoring timer;

monitoring, within the monitoring timer, the production environment for a second increase in the resource limitation;

making a third determination, after completion of the monitoring timer, that the resource limitation increased to a second new resource limitation;

making a third determination that the second new resource limitation is not exceeded by the second alert event; and resolving the alert event after the increase of the resource limitation.

9. The non-transitory computer readable medium of claim 6, wherein at least one logical device of the currently active logical devices is a virtual machine.

10. The non-transitory computer readable medium of claim 6, wherein at least one logical device of the currently active logical devices is an application container.

11. A system, comprising:

a processor; and memory comprising instructions, which when executed by the processor, performs a method comprising:

obtaining a notification for an alert event for the production environment, wherein the alert event is for installation of a new logical device in the production environment while the resources in the production environment are in a critical condition;

in response to the notification:

making a determination that a resource limitation is exceeded by the alert event, wherein the determination is based on a total resource availability of the production environment and further based on an expected resource use of the new logical device;

based on the determination, performing a resource elasticity process based on a priority list to increase the resource limitation to a new resource limitation such that the alert event does not exceed the new resource limitation, wherein the resource limitation is based on available computing resources in the production environment, wherein the resource elasticity process comprises:

determining an order of suspension of currently active logical devices in the production environment based on the priority list, wherein the order of suspension is determined based on a monitoring of the currently active logical devices based on performance metrics and resource utilization metrics of each of the currently active logical devices; and

suspending, based on the order of suspension, the
currently active logical devices to increase to
the new resource limitation; and
resolving the alert event after the increase of the
resource limitation.
12. The system of claim 11, the method further comprising:
prior to performing the resource elasticity process, initiating a monitoring timer;
monitoring, within the monitoring timer, the production
environment for a second increase in the resource
limitation; and
making a second determination, after completion of the
monitoring timer, that the resource limitation did not
increase.
13. The system of claim 11, the method further comprising:
obtaining a second notification for a second alert event;
in response to the second notification:

making a second determination that the resource limitation is exceeded by the alert event;
initiating a monitoring timer;
monitoring, within the monitoring timer, the production
environment for a second increase in the resource
limitation;
making a third determination, after completion of the
monitoring timer, that the resource limitation
increased to a second new resource limitation;
making a third determination that the second new
resource limitation is not exceeded by the second
alert event; and
resolving the alert event after the increase of the
resource limitation.
14. The system of claim 11, wherein at least one logical
device of the currently active logical devices is a virtual
machine.

* * * * *